US010234745B2

(12) United States Patent
Moffitt et al.

(10) Patent No.: US 10,234,745 B2
(45) Date of Patent: Mar. 19, 2019

(54) OPTICAL SOLID-STATE BEAM STEERING USING NON-LINEAR CONVERTER

(71) Applicant: BAE SYSTEMS INFORMATION AND ELECTRONIC SYSTEMS INTEGRATION INC., Nashua, NH (US)

(72) Inventors: Paul R. Moffitt, Hollis, NH (US); Peter A. Ketteridge, Amherst, NH (US); Peter G. Schunemann, Hollis, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/641,683

(22) Filed: Jul. 5, 2017

(65) Prior Publication Data
US 2019/0011803 A1   Jan. 10, 2019

(51) Int. Cl.
| | | |
|---|---|---|
| *G02F 1/365* | (2006.01) | |
| *G02F 1/35* | (2006.01) | |
| *G02B 6/293* | (2006.01) | |
| *G02B 6/125* | (2006.01) | |

(Continued)

(52) U.S. Cl.
CPC ............ *G02F 1/365* (2013.01); *F41H 13/005* (2013.01); *G02B 6/125* (2013.01); *G02B 6/29331* (2013.01); *G02F 1/3544* (2013.01); *G02F 1/3556* (2013.01); *G02F 2001/3548* (2013.01); *G02F 2202/101* (2013.01)

(58) Field of Classification Search
None
See application file for complete search history.

(56) References Cited

U.S. PATENT DOCUMENTS

| | | |
|---|---|---|
| 7,339,718 B1 | 3/2008 | Vodopyanov et al. |
| 7,349,609 B1 | 3/2008 | Vodopyanov et al. |
| 7,778,290 B2 | 8/2010 | Sacks et al. |

(Continued)

FOREIGN PATENT DOCUMENTS

| | | |
|---|---|---|
| CA | 2883482 | 3/2014 |
| EP | 2890971 | 7/2015 |

(Continued)

OTHER PUBLICATIONS

Li et al., "Electrooptic Wafer Beam Deflector in LiTaO3," IEEE Photonics Technology Letters, Nov. 1996, pp. 1486-1488, vol. 8, No. 11.

(Continued)

*Primary Examiner* — Jerry Rahll
(74) *Attorney, Agent, or Firm* — Sand, Sebolt & Wernow LPA; Scott J. Asmus

(57) ABSTRACT

A solid state optical beam steering device and method of operation includes converting a frequency or wavelength of a signal in a non-linear converter associated with one channel just before launch. A second channel has a similar constructions and operation. A processor compares the phase difference between the two channels and uses the difference to horizontally steer a beam without moving mechanical parts. This establishes the solid-state nature of the present disclosure. The non-linear converter may be a quasi-phase matched non-linear converter with alternating crystal domains.

20 Claims, 5 Drawing Sheets

(51) Int. Cl.
    *G02F 1/355*    (2006.01)
    *F41H 13/00*    (2006.01)

(56) References Cited

U.S. PATENT DOCUMENTS

| | | |
|---|---|---|
| 7,787,724 B2 | 8/2010 | Creeden et al. |
| 7,953,128 B2 | 5/2011 | Creeden et al. |
| 8,154,792 B1 | 4/2012 | Weyburne et al. |
| 8,169,692 B2 | 5/2012 | Rice et al. |
| 8,427,738 B2 | 4/2013 | Stievater et al. |
| 8,531,760 B2 | 9/2013 | Kondo et al. |
| 8,619,356 B1 | 12/2013 | Weyburne et al. |
| 9,057,891 B2 | 6/2015 | Stievater et al. |
| 9,118,163 B2 | 8/2015 | Kim et al. |
| 9,261,647 B1 | 2/2016 | Cox et al. |
| 9,410,846 B2 | 8/2016 | Tidemand-Lichtenberg et al. |
| 9,523,607 B2 | 12/2016 | Malcolm |
| 2003/0118347 A1 | 6/2003 | Papaparaskeva et al. |
| 2009/0207876 A1 | 8/2009 | Henriksson et al. |
| 2010/0202728 A1* | 8/2010 | Blumberg ............ B82Y 20/00 385/14 |
| 2011/0064096 A1 | 3/2011 | Shah et al. |
| 2013/0258343 A1 | 10/2013 | Zhu et al. |
| 2014/0254618 A1 | 9/2014 | Shah et al. |
| 2015/0198482 A1 | 7/2015 | Zhu et al. |
| 2015/0244143 A1 | 8/2015 | Kim et al. |
| 2015/0260572 A1 | 9/2015 | Malcolm et al. |
| 2016/0062210 A1 | 3/2016 | Moulton |
| 2017/0102604 A1 | 4/2017 | Ebrahim-Zadeh et al. |

FOREIGN PATENT DOCUMENTS

| | | |
|---|---|---|
| EP | 3019912 | 5/2016 |
| WO | 2009114125 | 9/2009 |
| WO | 2014033465 | 3/2014 |
| WO | 2015144922 | 10/2015 |

OTHER PUBLICATIONS

McManamon et al., "A Review of Phased Array Steering for Narrow-Band Electrooptical Systems," Proceedings of the IEEE, Jun. 2009, pp. 1078-1096, vol. 97, No. 6.

Doylend et al., "Two-dimensional free-space beam steering with an optical phased array on silicon-on-insulator," Optics Express, Oct. 24, 2011, pp. 21595-21604, vol. 19, No. 22.

Guo et al., InP Photonic Integrated Circuit for 2D Optical Beam Steering, 2011 IEEE Photonics Conference (PHO), 1 page.

* cited by examiner

OPTICAL SOLID-STATE BEAM STEERING USING NON-LINEAR CONVERTER

BACKGROUND

Technical Field

The present disclosure relates to systems and methods for steering an optical beam. More particularly, the present disclosure relates to solid state optical beam steering devices that do not include moving mechanical parts. Specifically, the present disclosure relates to a solid state optical beam steering device using a quasi-phase matched non-linear converter.

Background Information

Many infrared countermeasure (IRCM) and communication systems must employ some type of pointing mechanism as part of their normal operation. The pointing mechanism is used to direct (i.e., point) a laser beam at a target or threat. Typically, the pointed beam is used to disable the guidance system of the incoming threat (such as an enemy missile or enemy aircraft). Currently, it is believed that mechanical gimbals are the only available means for beam steering, but they have many shortcomings such as slow speed, vibration and poor lifetime. In addition they introduce undesired side effects such as increased aerodynamic drag and radar cross section.

Some non-mechanical beam steering techniques utilize a spatial light modulator array based on liquid crystal technology. Although this approach is useful in niche applications, it has a slow angular change rate, is expensive, cannot easily handle angles larger than a few degrees, has a limited optical bandwidth and have low power handling.

Birefringent crystals have also been explored as a beam steering mechanism. Although they can achieve much higher angular slew rates, they also have a limited steering angle range, require very high voltages for operation and are difficult to make in a configuration that allows two-dimensional steering.

Microelectronic mechanical structures (MEMS) offer another mechanism for beam modification and are in widespread commercial manufacture, such as the Digital Light Projector (DLP) approach sold by Texas Instruments. The limitation of this approach is achieving a calibrated angle capability. The DLP system uses mirrors with only two positions, on and off and is not capable of beam steering. Some research has been done on phase modulating mirrors but as yet this technology does not have the uniformity and stability needed for IR beam steering.

In the radio frequency (RF) and microwave domain, beam steering and forming is very often done by phased arrays of emitting elements driven by a common source. The phase and amplitude of the coherent energy arriving at each element can be easily modified so that when that the combined energy in the far field can be steered. Optical beam steering by Optical Phased Arrays is actively being investigated in the shortwave infrared (SWIR) range. A major difficulty in this approach has been launching sufficient coherent power into the waveguide array, especially into single mode high index contrast waveguide arrays. One advantageous approach so far is to incorporate on-board heterogeneously integrated amplifiers such as semiconductor optical amplifiers. This introduces a large amount of waste power onto the modulator chip. This approach is also difficult to translate to the midwave infrared (MWIR) and longwave infrared (LWIR) bands since at this point in time semiconductor optical amplifiers (SOAs) do not exist that operate in the MWIR and LWIR bands.

SUMMARY

Issues continue to exist with optical systems that require an optical beam to be swept or steered. Optical systems should be able to take advantage of some of the same advantages that the RF systems have had for many years, the main advantage being the ability to sweep a beam in a raster pattern that can paint a scene with a very narrow, very high power beam. Coupled with this is the ability to quickly modify the beam shape so as to designate a single (moving) target in a random access manner. An additional desirable feature, common in the RF systems, is the ability to build such a system that is conformal with the skin of the platform so as to not modify the platform aerodynamic performance. The increasing emphasis on hyperspectral techniques means that any solution must be adaptable enough to perform anywhere within the IR visible and UV optical spectrum. As always size weight and power must be kept as low as possible. The present disclosure addresses these and other issues In one aspect, an exemplary embodiment of the present disclosure may provide a semiconductor optical amplifier operable in a midwave infrared (MWIR) range and a longwave infrared (LWIR) range comprising: a first waveguide adapted to carry a first optical signal; a second waveguide adapted to carry a second optical signal, wherein the first waveguide is evanescently coupled to the second waveguide; and a quasi-phase matched (QPM) non-linear converter in optical communication with the second waveguide.

In another aspect, an exemplary embodiment of the present disclosure may provide a solid state optical beam steering device comprising: a first waveguide carrying a modulated first optical signal; a second waveguide carrying a pump signal; and a first non-linear converter optically aligned with the second waveguide and evanescently coupled to the first signal to amplify or convert the first optical signal to a different wavelength band or frequency and establish a second optical signal from the pump signal adapted to be steered based on the different wavelength band or frequency. This embodiment or another embodiment may further provide wherein the first non-linear converter is a quasi-phase matched (QPM) third waveguide comprising: a plurality of aligned sections formed from a conversion first material, wherein adjacent sections alternate directions to reverse the sign of the second optical signal moving along the QPM waveguide. This embodiment or another embodiment may further provide wherein cladding material is positioned intermediate the first waveguide and the QPM third waveguide. This embodiment or another embodiment may further provide a core of the first waveguide adjacent a cladding material; wherein the first non-linear converter is coupled to the first waveguide. This embodiment or another embodiment may further provide wherein the core is completely surrounded the cladding material. This embodiment or another embodiment may further provide wherein the conversion first material of the first non-linear converter is bonded directly to the cladding material over the first waveguide. This embodiment or another embodiment may further provide an interface defined by a direct abutment of a terminal end of the second waveguide to a first section of the non-linear converter. This embodiment or another embodiment may further provide a gap defined by a spaced alignment of a terminal end of the second waveguide with a first section of the non-linear converter. This embodiment or another embodiment may further provide a pump generating the pump signal that is converted or amplified into the second optical signal. This embodiment or another embodiment may further provide a launching area, wherein the first non-linear converter formed from the conversion first material is positioned in the launching area. This embodiment or another embodiment may further provide wherein the conversion first material is orientation patterned gallium arsenide (OP-GaAs). This embodiment or another embodiment may further provide wherein the conversion first material of the non-linear converter is lattice matched with the first waveguide. This embodiment or another embodiment may further provide wherein the conversion first material is orientation patterned gallium phosphide (OP-GaP).

In yet another aspect, an embodiment of the present disclosure may provide a method for solid state optical beam steering comprising: transmitting a first signal along a first waveguide associated with a first channel and modulating the first signal; transmitting an optically pumped second signal along a second waveguide associated with the first channel; transferring protonic energy from the first signal to the second signal via evanescent coupling; converting one of the frequency and wavelength of the second signal in a non-linear converter to create a first optical end signal associated with the first channel; and steering an optical beam horizontally through a phase difference of the first optical end signal relative to a second optical end signal generated in a second channel. This embodiment or another embodiment may further provide transmitting the second signal along a quasi-phase matched (QPM) non-linear converter including a plurality of aligned alternating crystal orientations. This embodiment or another embodiment may further provide wherein converting one of the frequency and wavelength of the second signal occurs subsequent to the modulating of the first signal in the QPM non-linear converter. This embodiment or another embodiment may further provide pointing an optical beam at an approaching hostile target, wherein the optical beam is steered based, at least in part, on the first optical end signal; and effecting disablement of a enemy guidance system on the approaching hostile target. This embodiment or another embodiment may further provide wherein the step of steering the optical beam is accomplished without any moving mechanical parts.

In yet another aspect, an embodiment of the present disclosure may provide at least one non-transitory computer readable storage medium having instructions encoded thereon, that when executed by one or more processors carried by an aircraft vehicle perform operations to effect disablement of a guidance system on an approaching hostile target, the operations include: (i) transmit a first optical signal along a first waveguide associated with a first channel and modulating the first signal; (ii) transmit a pumped second optical signal along a second waveguide associated with the first channel; (iii) transfer protonic energy from the first optical signal to the second optical signal via evanescent coupling; and (iv) convert one of the frequency and wavelength of the second signal in a non-linear converter to create a first optical end signal associated with the first channel. The at least one non-transitory computer readable storage medium, may be provided in combination with (to form a IRCM system) a semiconductor optical amplifier operable in a midwave infrared (MWIR) range and a longwave infrared (LWIR) range comprising: a first waveguide to transmit the first optical signal; a second waveguide to transmit the second optical signal, wherein the first waveguide is evanescently coupled to the second waveguide; and a quasi-phase matched (QPM) non-linear converter in optical communication with the second waveguide.

In yet another aspect, an example may provide a solid state optical beam steering device and method of operation includes converting a frequency or wavelength of a signal in a non-linear converter associated with one channel just before launch. A second channel has a similar construction and operation. A processor compares the phase difference between the two channels and uses the difference to horizontally steer a beam without moving mechanical parts. This establishes the solid-state nature of the present disclosure. The non-linear converter may be a quasi-phase matched non-linear converter with alternating crystal domains.

In yet another aspect, an example embodiment of the present disclosure may provide a solid state optical beam steering device comprising: a first waveguide carrying a modulated first signal; a second waveguide carrying an optical pump signal, wherein the first waveguide is evanescently coupled to the second waveguide; and a first non-linear converter optically aligned with the second waveguide to amplify or convert the first optical signal to a different wavelength band or frequency and establish an optical second signal from the optical pump signal adapted to be steered based on the different wavelength band or frequency. This embodiment or another may further provide wherein the first non-linear converter is a quasi-phase matched (QPM) third waveguide comprising: a plurality of aligned sections formed from a conversion first material, wherein adjacent sections alternate directions to reverse the sign of the second optical signal moving along the QPM waveguide. This embodiment or another may further provide a cladding layer positioned intermediate the first waveguide and the QPM third waveguide. This embodiment or another may further provide a core of the first waveguide adjacent a cladding layer; wherein the first non-linear converter is evanescently coupled to the first waveguide. This embodiment or another may further provide wherein the core of the first waveguide is completely surrounded the cladding layer. This embodiment or another may further provide wherein the conversion first material of the first non-linear converter is bonded directly to the cladding layer over the first waveguide. This embodiment or another may further provide an interface defined by a direct abutment of a terminal end of the second waveguide to a first section of the non-linear converter. This embodiment or another may further provide a gap defined by a spaced alignment of a terminal end of the second waveguide with a first section of the non-linear converter. This embodiment or another may further provide a pump generating the pump signal that is converted or amplified into the optical second signal. This embodiment or another may further provide a launching area, wherein the first non-linear converter formed from the conversion material defines at least a portion of the launching area. This embodiment or another may further provide wherein the conversion material is orientation patterned gallium arsenide (OP-GaAs). This embodiment or another may further provide wherein the conversion material of the non-linear converter is lattice matched with the first waveguide. This embodiment or another may further provide wherein the conversion material is orientation patterned gallium phosphide (OP-GaP). Lithium niobate (LiNbO$_3$ may also be a candidate QPM material.)

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
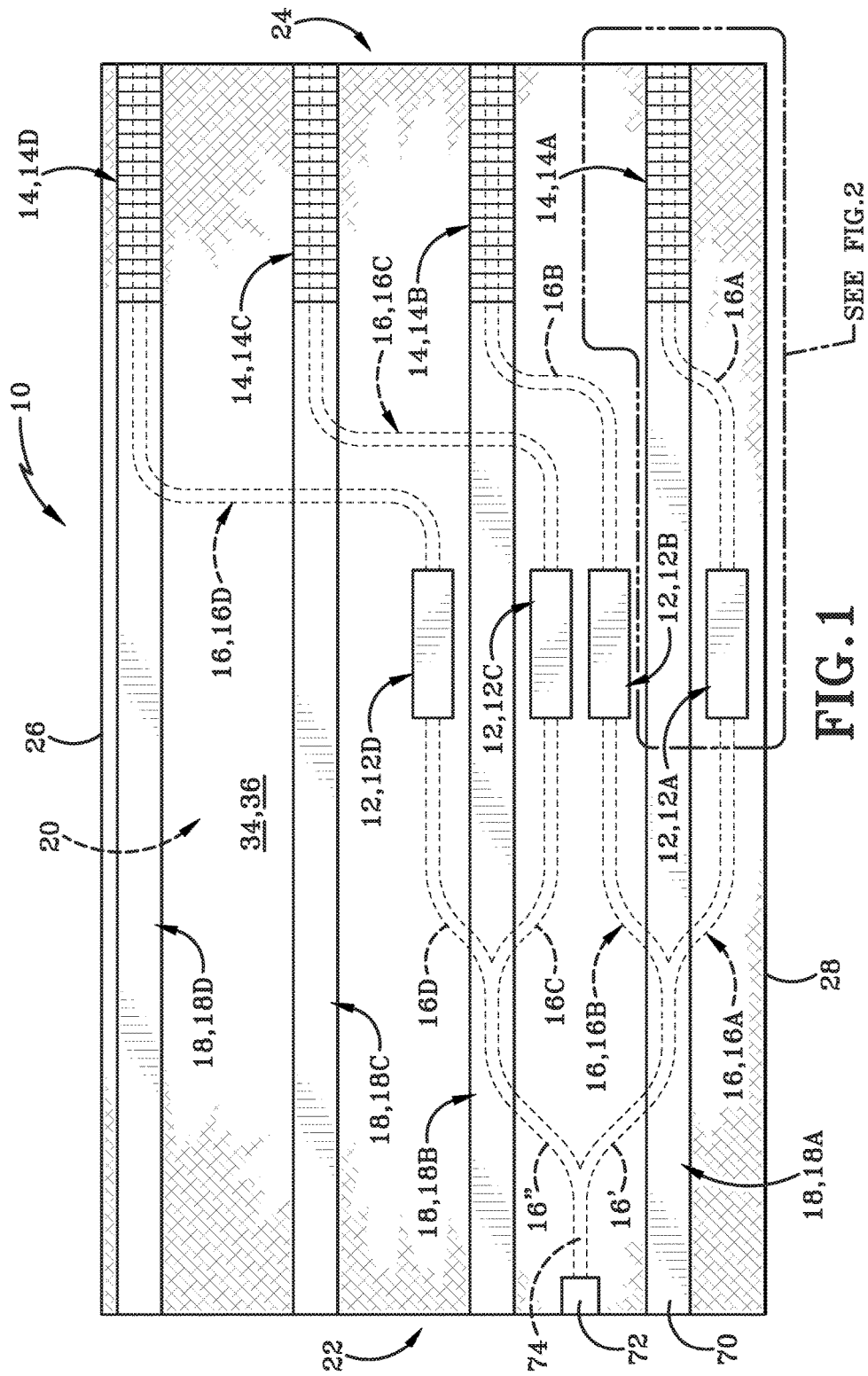
FIG. 1 is a diagrammatic top view of a solid state optical beam steering device in accordance with the present disclosure.

A solid state optical beam steering device is shown generally throughout the figures at 10. The solid state optical beam steering device 10 may include a phase modulator 12, a non-linear converter 14, a first waveguide 16, a second waveguide 18, and a base substrate 20.

Base substrate 20 includes a first end 22 and a second end 24 defining a longitudinal direction therebetween. First and second ends 22, 24 may extend parallel to each other. A first edge 26 extends parallel with a second edge 28 between the first end 22 and the second end 24. A transverse direction is defined between the first edge 26 and the second edge 28 that is perpendicular to the longitudinal direction extending between first end 22 and second end 24. Substrate 20 further includes a first major surface 30 facing opposite a second major surface 32 (FIG. 3) defining a thickness therebetween. The substrate 20 is formed from a silicon base material; however, other materials may be utilized as one having ordinary skill in the art would understand.

A silicon dioxide layer 34 (FIG. 4), which may also be referred to as cladding layer 34, is positioned over the first major surface 30 of the substrate 20. The silicon dioxide layer 34 includes a first major surface 36 opposite a second major surface 38. Second major surface 38 of the silicon dioxide layer 34 is in substantial contact with the first major surface 30 of the substrate 20. The substrate 20 is thicker than layer 34.

Figure 3:
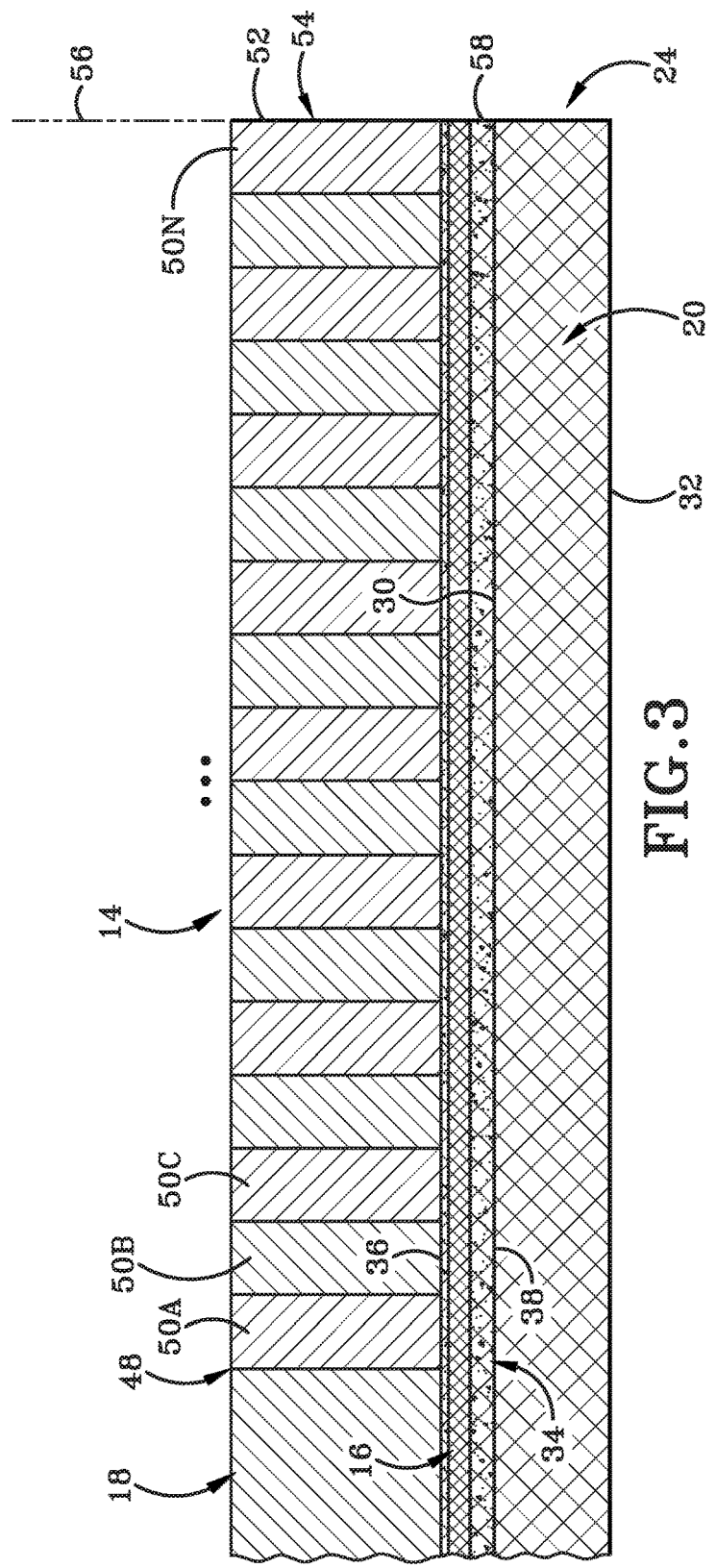
FIG. 3 is a longitudinal cross-section taken along line 3-3 in FIG. 2.
Figure 4:
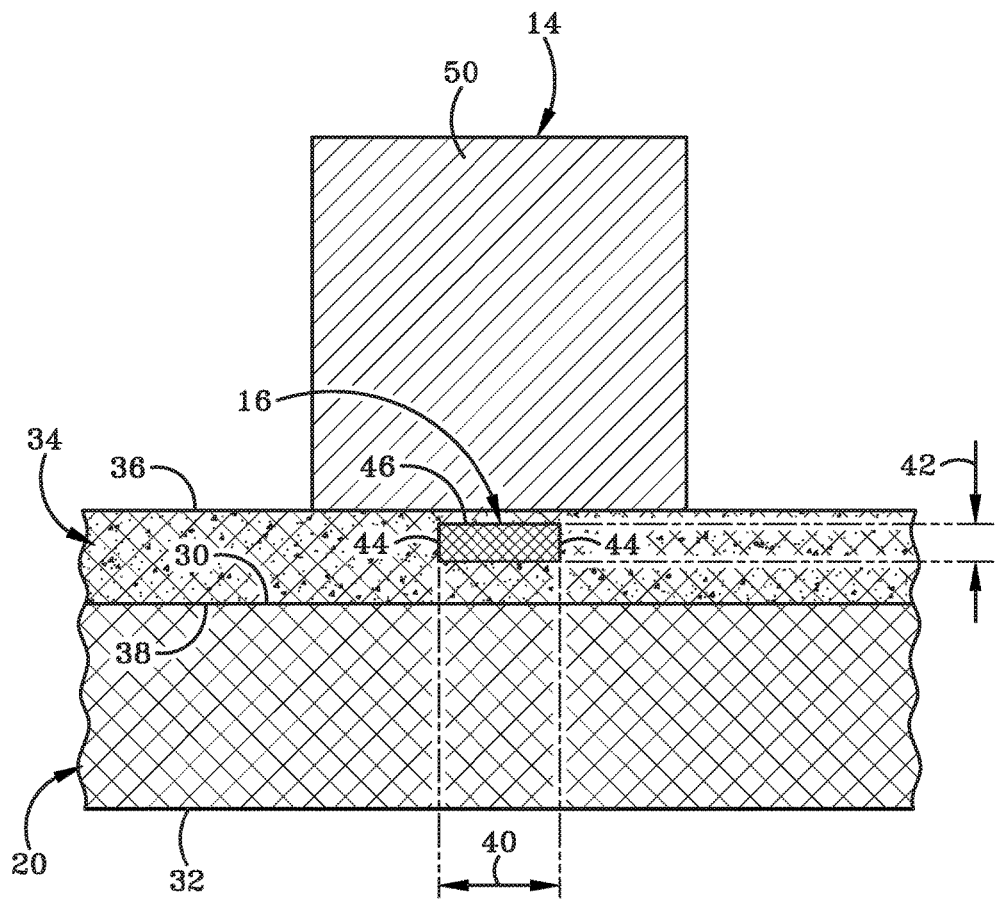
FIG. 4 is a transverse cross-section taken along line 4-4 in FIG. 2.

First waveguide 16 is positioned within the silicon dioxide layer 34. In one example, the first waveguide 16 is buried within the silicon dioxide layer 34. The buried position of silicon dioxide layer 34 positions first waveguide 16 intermediate the first surface 36 and the second surface 38 of silicon dioxide layer 34. The waveguide 16 buried within silicon dioxide layer 34 is positioned above substrate 20 and below second waveguide 18 and below non-linear converter 14 when viewed in cross-section as depicted in FIG. 3. The vertical positioning of the buried first waveguide 16 is slightly offset towards one of the surfaces within silicon dioxide layer 34. As depicted in FIG. 4, first waveguide 16 may be buried within silicon dioxide layer 34, but be positioned slightly closer to the first major surface 36 than the second major surface 38. Stated otherwise, the first waveguide 16 may be closer to the second waveguide 18 and the non-linear converter 14 than it is to the substrate 20. In one example, the buried configuration of the first waveguide 16 within layer 34 enables layer 34 to act as a cladding layer completely surrounding the first waveguide 16.

As depicted in FIG. 4, first waveguide 16 may include a transversely aligned width 40 bound by vertically aligned endwalls 44 of the first waveguide 16, and may include a vertically aligned thickness 42 bound by transversely aligned walls 46 of first waveguide 16, wherein a core of the waveguide resides between endwalls 44 and walls 46. The vertically aligned thickness 42 of first waveguide 16 is smaller than the vertically aligned thickness of silicon dioxide layer 34 measured from first surface 36 to second surface 38. In one embodiment, the transversely aligned wall 46 of first waveguide 16 is aligned parallel with surface 36 on silicon dioxide layer 34. In another particular embodiment, the first waveguide 16 does need to be buried within the silicon dioxide layer 34, and in this version, the transversely aligned wall 46 of first waveguide 16 would be coplanar with the first major surface 36 of the silicon dioxide layer 34. Furthermore, the boundaries defining a core of the first waveguide 16 do not need to be linearly defined. Alternative types of waveguides may be utilized which have non-linear or atypical or gradiently defined boundaries.

With continued reference to FIG. 3 and FIG. 4, the second waveguide 18 is positioned above the silicon dioxide layer 34 and is in direct contact therewith. More particularly, a bottom surface of the second waveguide 18 is directly connected to the first surface 36 of layer 34. Stated otherwise, the layer 34 may be positioned intermediate the second waveguide 18 and the base substrate 20. The second waveguide 18 may be formed from an orientation-patterned conversion or amplifying material. An exemplary conversion material utilized to form second waveguide 18 is orientation-patterned gallium arsenide (OP-GaAs) or orientation-patterned gallium phosphide (OP-GaP). In one example, the conversion material forming the non-linear converter 14 is lattice matched with the first waveguide 16, the second waveguide 18, or both. The second waveguide 18 is evanescently coupled to the first waveguide 16 to allow protonic energy to transfer from the first waveguide 16 to the second waveguide 18, as will be described in greater detail below. Additionally, the second waveguide 18 is longitudinally aligned with the non-linear converter 14 and is in direct contact therewith at an interface 48. The interface 48 establishes an optical communication between second waveguide 18 and the non-linear converter 14. The interface 48 of the second waveguide 18 with the non-linear converter 14 enables pump signals moving through the second waveguide 18 to enter the non-linear converter 14. The non-linear converter 14 is positioned above the first waveguide 16 that is buried in the silicon dioxide layer 34. An alternative embodiment is provided that defines a gap between an terminal end of the second waveguide and a first section or beginning of the non-linear converter 14.

Non-linear converter 14 may be a quasi-phased matched (QPM) non-linear converter. The QPM non-linear converter includes a plurality of domains or sections that are longitudinally aligned in direct contact with alternating invertedly oriented crystal section patterns. The QPM non-linear converter may also be referred to herein as a third waveguide.

Further, the non-linear converter 14 may include a plurality of domain sections that are longitudinally aligned front to back relative to signal flow moving longitudinally along the second waveguide 18 and into converter 14. A first section from the plurality of domain sections is identified at 50A. First section 50A has an orientation pattern that is opposite that of second waveguide 18 at interface 48. A second section 50B is adjacent optically downstream from first domain section 50A and includes an orientation pattern that is opposite that of first section 50A. A third section 50C is optically downstream from second section 50B and has an orientation pattern that is opposite that of second section 50B and the same as first section 50A. The alternating pattern of domain sections continues and terminates at end domain section 50N, wherein "N" is an integer of domain sections. The last domain section 50N defines an exit interface 52. In one particular example, the height of each of the plurality of sections 50A-50N is uniform as depicted in FIG. 3. In another particular embodiment, the non-linear converter 14 and every one of the plurality of sections 50A-50N has a common height equal to that of second waveguide 18.

Figure 2:
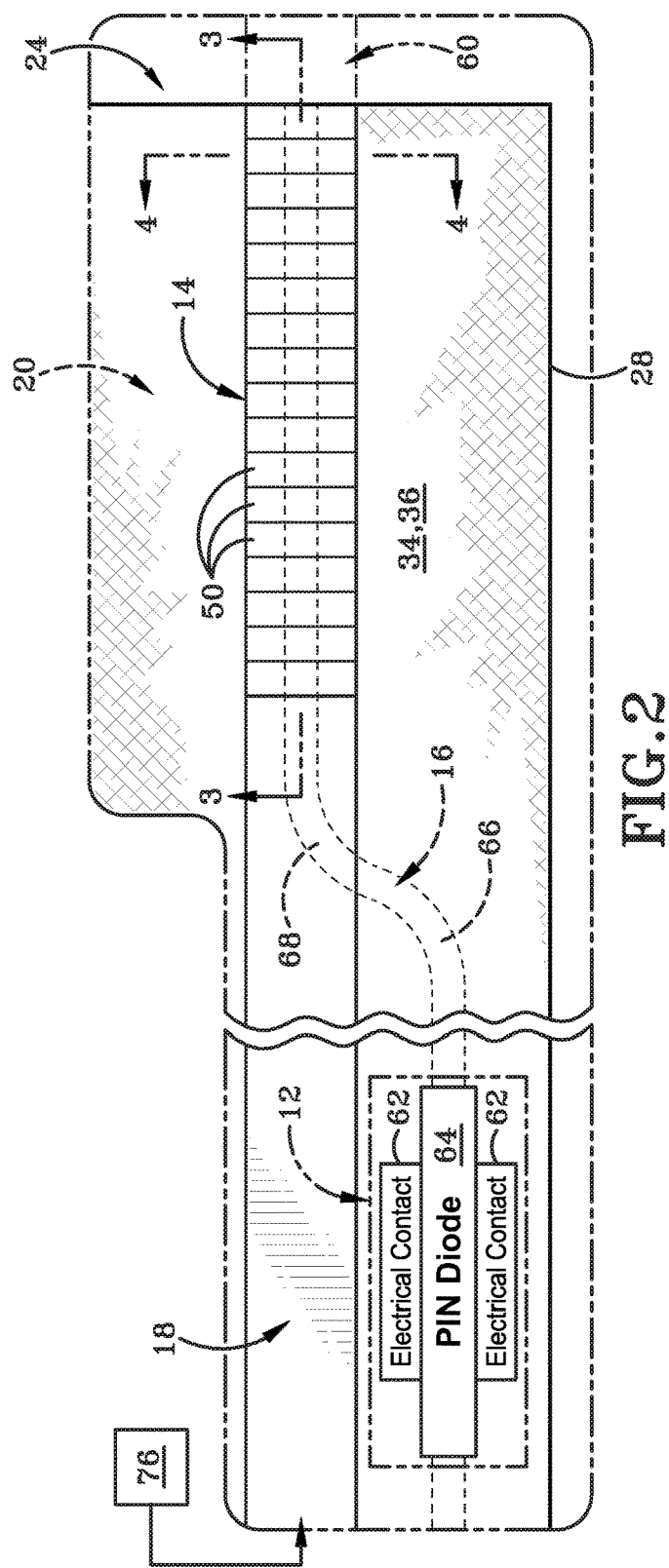
FIG. 2 is an enlarged top view of the region labeled "SEE FIG. 2" in FIG. 1.

With continued reference to FIG. 3, a common end boundary 54 is defined near the second end 24 of substrate 20 by the interface 52 being aligned coplanar along plane 56 with an exit interface 58 of the silicon dioxide layer 34 and the substrate 20 and the first waveguide 16. The coplanar alignment defining the common end boundary 54 enables, as will be described in greater detail below, the device 10 to be connected with a secondary device, such as a grating 60 (FIG. 2) or other optical device, in a surface launch arrangement or an end launch arrangement, which both may be referred to herein as a "launching area."

Referring back to FIG. 2, the phase modulator 12 may include one or more electrical contacts 62 and a pin diode 64 in operative communication with the first waveguide 16. While the first waveguide 16 is modulated by the first modulator 12, the first waveguide 16 is not located below the second waveguide 18. Subsequent to the phase modulator, the first waveguide bends at a first bend 66 and bends at a second bend 68 so as to position the first waveguide 16 below the second waveguide 18 and below the non-linear converter 14.

In one particular embodiment, the second waveguide 18 extends fully from the first end 22 to the second end 24 of substrate 20. A first end 70 is coplanar along end 22 so as to enable the first end 70 to act as input that can be end launched (or surface launched) to receive a signal, preferably an optical pump signal form a pump 76, therein.

Referring back to FIG. 1, one embodiment of the solid state optical beam steering device 10 has four channels. When the device 10 includes four channels, there are four phase modulators, namely, a first phase modulator 12A, a second phase modulator 12B, a third phase modulator 12C, and a fourth phase modulator 12D. There is a first non-linear converter 14A, a second non-linear converter 14B, a third non-linear converter 14C, and a fourth non-linear converter 14D. Each channel respectively includes its own first waveguide 16A, 16B, 16C, and 16D. Additionally, each channel includes a respective second waveguide 18A, 18B, 18C, and 18D. A power splitter 72 is in operative communication with the first waveguides 16A-16D. The power splitter 72 is in operative communication with a primary feed waveguide 74, which is split into two waveguides 16', 16". Waveguide 16' is split into the first waveguide 16A of the first channel and the first waveguide 16B of the second channel. The waveguide 16" is split into waveguide 16C of the third channel and waveguide 16D of the fourth channel.

In operation, with respect to FIG. 1, an optical signal beam is generated and input into the power splitter 72 and is sent down the primary line 74. Line 74 and the optical signal moving therethrough split into two lines along a first portion waveguide 16' of the waveguide and a second portion waveguide 16". With respect to first portion 16', the signal is split again into the first waveguide 16A, the first channel and the first waveguide 16B of the second channel. A similar split occurs between the third and fourth channels in the first waveguide 16C of the third channel and the first waveguide 16D of the fourth channel. The optical signal moving through the phase modulator 12A is modulated via the pin diodes 64 and their respectively electrical contacts 62. The optical signal continues to move along first waveguide 16A around the first bend 66 and around the second bend 68 to be positioned beneath second waveguide 18A and be positioned beneath non-linear converter 14A with a portion of layer 34 acting as cladding material or a cladding layer, thus burying the first waveguide 16A there below. The first waveguide 16A is evanescently coupled with the second waveguide 18A. Evanescently coupling of the first waveguide 16A with the second waveguide 18A effectuate protonic energy from the first waveguide 16 to transfer to the second waveguide 18.

Simultaneous to the first optical signal moving along first waveguide 16A subject to being modulated by first modulator 12A, a pump inputs an optical pump signal to move along the second waveguide 18A. The pump signal moving along second waveguide 18A continues longitudinally along the length of the second waveguide 18A to the interface 48 where the non-linear converter 14A formed essentially of a QPM device with alternating domains or sections. The QPM device of the non-linear converter 14A contains different wavelengths of the pump signal moving along second waveguide 18 in phase. This is necessary as every wavelength has different refractive index in different materials. However, in accordance with an aspect of the present disclosure, the wavelengths must travel at the same speed in order for the horizontal steering to operate. Thus, the longitudinally aligned width of each of the domain sections 50A, 50N are spaced by a longitudinally aligned distance, which equates to a coherence line. So as soon as the waves moving along the second waveguide and the QPM non-linear converter 14A are 180° out of phase, the orientation of an adjacent section of crystal material is inverted. The alternating inversions of QPM non-linear converter 14A bring the waves back in phase so as to effectuate quasi-phase matching. While some of the waves may not be perfectly in phase, the QPM material of the non-linear converter 14A consistently brings the out of phase waves back into phase at regular pi intervals.

A similar process occurs in the second channel with the signal being fed along second waveguide 18B of the second channel and passing through second QPM non-linear converter 14B of the second channel. Second waveguide 18B of the second channel is also evanescently coupled with the first waveguide 18B of the second channel.

Horizontal steering occurs by coupling at least two of the channels with either an end launched device or a surface launched device, such as device 60, near the second end 24 of the substrate 20. Phase difference between the first channel and the second channel is what allows horizontal beam steering to occur. Additionally, a secondary grating, such as grating 60 may be coupled near the end 24 of the substrate, such as in the launching area, to effectuate a surface launch or an end launch which would enable a vertical steering as well. The pump inputs to the first ends 70 of the respective second waveguides 18A, 18B, 18C, and 18D may be coupled to pumps in a variety of different manners. One exemplary manner of inputting pump signals into the second waveguide is being brought through individual fiber optics.

In accordance with one aspect of the present disclosure, the device 10 is capable of supporting many more than two channels on each chip, for example, four channels as shown in FIG. 1, or more than four channels as one having ordinary skill in the art would understand such as eight channels, sixteen channels, thirty-two channels, sixty-four channels, and the like. Each device is capable of sweeping or steering the created beam in a horizontal direction based on the phase difference between channels.

With continued reference to the operation of the present disclosure, the solid state optical beam steering device 10 converts the frequency of a signal subsequent to phase modulation at phase modulator 12. Thus, phase modulation occurs in the first waveguide 16 at the phase modulator 12. By adding the QPM non-linear converter 14 operatively after the modulator 12, the device 10 can modulate the phase fixed wavelength of the signal in first waveguide 16 via phase modulator 12 and then the device 10 changes the frequency or the wavelength of the output near the end launch at the common boundary 54. Stated otherwise, solid state optical beam steering device changes the frequency of the signal wave right before output at the end launch or surface launch. In one example, this allows device 10 to frequency convert or wavelength convert a signal in a wave band that would ordinarily not be able to be converted/amplified or that is in a band that is traditionally very difficult to convert or amplify. For example, for a 4 micron wavelength band, it is difficult to get base modulators to operate in this wavelength band. In the present disclosure, optical beam steering device 10 creates a phase modulation structure in the material with technology that is already developed in the 1.55 micron band and it frequency converts or wavelength converts the signal to any other band as desired after modulation has been performed and just before end launch or surface launch occurs.

In accordance with an aspect of the present disclosure, device 10 enables beam steering of optical beams sent through device 10 to occur without mechanical parts. Stated otherwise, device 10 accomplishes solid state beam steering. The device 10 accomplishes this based on the aforementioned construction by effectuating heterogeneously integrated multiple channel modulators in a matrix form coupled with a matrix or a plurality of non-linear converters 14. Non-linear converters are highly efficient so that very little heat is generated when the non-linear converter is mounted onto a chip (i.e., device 10), which in the aforementioned description is the substrate 20 with silicon dioxide layer 34 placed thereon. In operation, the device 10 enables optical beams to be steered in the horizontal direction without the use of mechanical moving parts. Stated otherwise, beam steering device 10 is a solid state device that effectuates horizontal steering or sweeping of optical signals or beams moving through the device. In one implementation, the beams move from the first end 22 towards the second end 24.

In accordance with an aspect of the present disclosure, the solid state optical steering beam device 10 provided herein may be implemented in infrared countermeasure (IRCM) and communication systems. The device 10 may be incorporated into a beam pointing or beam steering apparatus or other IRCM carried by an aircraft or airborne vehicle which is typically utilized to sweep an emitted laser beam in a raster or array pattern in order to paint a scene, target, or other object desired to be located with a very narrow and very high-powered laser beam. The beam steering is accomplished by phase difference between the channels of device 10, as described above, and enable a solid state beam steering system to be established so as to designate a single moving target in a random access manner. The sweeping pattern of the beam steered by device 10 allows the IRCM system on an aircraft to steer a generated beam without the traditional deficiencies present in mechanical systems, such as gimbal steering systems. Additionally, device 10 enables beam steering system to be formed in a complementary manner to be conformal with an outer surface of the airplane or flying vehicle. Additionally, device 10 in combination with the beam steering system on an aircraft increases emphasis on hyperspectral techniques so as to enable the device 10 and the beam steering system on the aircraft to be operable with the IR visible and UV optical spectrums. Furthermore, device 10 enables a beam steering system to be implemented that has a reduced size, weight, and power relative to conventional mechanical beam steering system. As is well understood, a beam steering device is typically implemented with a laser beam that is directed towards guidance and munition systems in approaching enemy aircraft. By steering a laser beam towards the approaching enemy aircraft or missile, the generated beam guided by the steering system including device 10 can disable the incoming threat to provide effective countermeasures for the aircraft carrying the beam steering system of which device 10 is a part, however typically the computer is carried by the aircraft needing the IRCM system.

Further, one or more processors implementing instructions from a non-transitory computer readable storage medium that are coded with the solid state optical beam steering/sweeping techniques described above may be embodied in any of a number of forms, such as a rack-mounted computer, an airborne computer, a legacy flight computer, a desktop computer, a laptop computer, or a tablet computer. Additionally, a computer may be embodied in a device not generally regarded as a computer but with suitable processing capabilities, including a Personal Digital Assistant (PDA), or any other suitable portable or fixed electronic device. These may or may not be carried by the aircraft upon with the device 10 may be mounted.

Also, the computer (which may be a smartphone) may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of sweeping a steered optical beam through the use of phase differences between channels without using moving or mechanical parts) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various exemplary concepts may be embodied as a non-transitory computer readable storage medium (or multiple non-transitory computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

For example, an example of one embodiment provides at least one non-transitory computer readable storage medium having instructions encoded thereon, that when executed by one or more processors carried by an aircraft vehicle perform operations to effect disablement of a guidance system on an approaching hostile target, the operations include: (i) transmit a first optical signal along a first waveguide associated with a first channel and modulating the first signal; (ii) transmit a pumped second optical signal along a second waveguide associated with the first channel; (iii) transfer protonic energy from the first optical signal to the second optical signal via evanescent coupling; and (iv) convert one of the frequency and wavelength of the second signal in a non-linear converter to create a first optical end signal associated with the first channel. This may be part of a beam steering logic on the aircraft. The at least one non-transitory computer readable storage medium, in combination with a semiconductor optical amplifier, such as device 10, operable in a midwave infrared (MWIR) range and a longwave infrared (LWIR) range that may also include: a first waveguide, such as first waveguide 16, to transmit the first optical signal; a second waveguide, such as waveguide 18, to transmit the second optical signal, wherein the first waveguide is evanescently coupled to the second waveguide; and a quasi-phase matched (QPM) non-linear converter, such as QPM non-linear converter 14, in optical communication with the second waveguide.

Also, various concepts may be exemplified as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Figure 5:
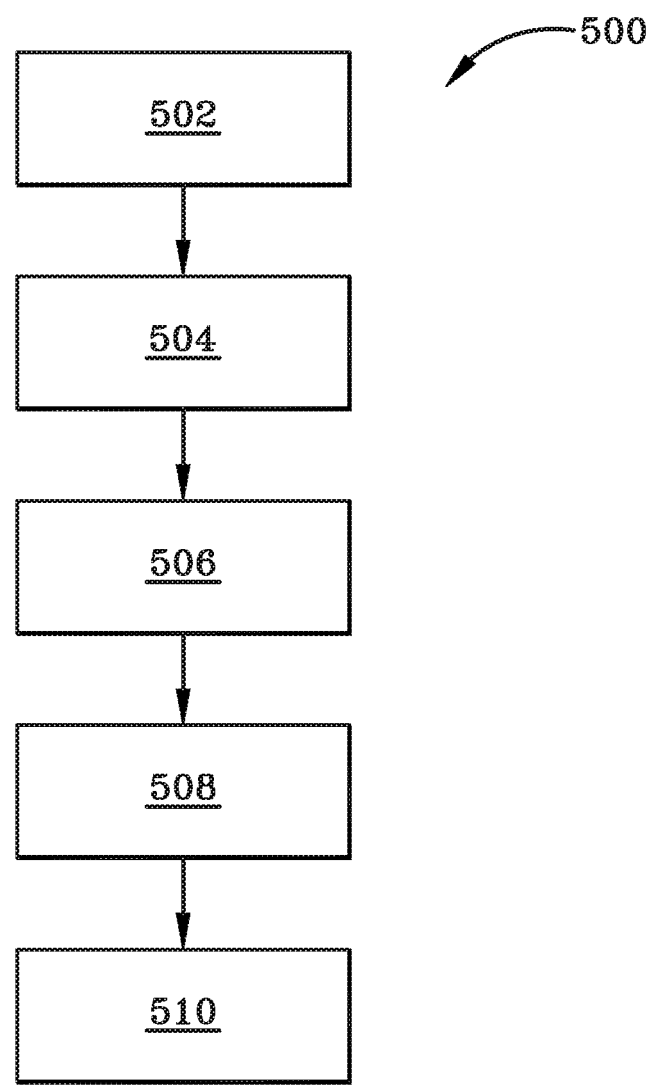
FIG. 5 is a flowchart of a method in accordance with an exemplary embodiment of the present disclosure.

FIG. 5 depicts an exemplary method in accordance with the present disclosure generally at 500. The method 500 for solid state optical beam steering comprises: transmitting a first signal along a first waveguide associated with a first channel and modulating the first signal, which is shown generally at 502. Transmitting an optically pumped second signal along a second waveguide associated with the first channel is shown generally at 504. Transferring protonic energy from the first signal to the second signal via evanescent coupling is shown generally at 506. Converting one of the frequency and wavelength of the second signal in a non-linear converter to create a first optical end signal associated with the first channel is shown generally at 508. Steering an optical beam horizontally through a phase difference of the first optical end signal relative to a second optical end signal generated in a second channel is shown generally at 510.

Method 500 may further provide transmitting the second signal along a quasi-phase matched (QPM) non-linear converter including a plurality of aligned alternating crystal orientations. Method 500 may further provide wherein converting one of the frequency and wavelength of the second signal occurs subsequent to the modulating of the first signal in the QPM non-linear converter. Method 500 may further provide pointing an optical beam at an approaching hostile target, wherein the optical beam is steered based, at least in part, on the first optical end signal; and effecting disablement of an enemy guidance system on the approaching hostile target. Method 500 may further provide wherein the step of steering the optical beam is accomplished without any moving mechanical parts While various examples or embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

All definitions, as defined and used herein, should be understood to control over dictionary definitions, definitions in documents incorporated by reference, and/or ordinary meanings of the defined terms.

"Logic", as used herein (for example "beam steering logic"), includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

As used herein, "evanescent" or "evanescent coupling" or the like refers to the coupling between two waves due to physical overlap of what would otherwise be described as the evanescent fields corresponding to the propagating waves.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment or example, to A only (optionally including elements other than B); in another embodiment or example, to B only (optionally including elements other than A); in yet another embodiment or example, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment or example, to at least one, optionally including more than one, A, with no B present (and optionally including elements other than B); in another embodiment or example, to at least one, optionally including more than one, B, with no A present (and optionally including elements other than A); in yet another embodiment or example, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like such as "an example," means that a particular feature, structure, or characteristic described in connection with the embodiments is included in at least some embodiments or examples, but not necessarily all embodiments or examples, of the present disclosure. The various appearances "an example," "an embodiment," "one embodiment," "some embodiments," "one particular embodiment," or "other embodiments," or the like, are not necessarily all referring to the same embodiments or examples.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed is:

1. A solid state optical beam steering device comprising:
   a first waveguide carrying a first optical wavelength;
   a phase modulator modulating the first wavelength;
   a second waveguide carrying an optical pump signal, wherein the first waveguide is evanescently coupled to the second waveguide; and
   a non-linear converter optically aligned with the second waveguide to amplify or convert the first optical wavelength to a different wavelength band or frequency and establish a second optical wavelength from the optical pump signal adapted to be steered based on the different wavelength band or frequency.

2. The solid state optical beam steering device of claim 1, wherein the non-linear converter is a quasi-phase matched (QPM) third waveguide comprising:
   a plurality of aligned sections formed from a conversion material, wherein adjacent sections alternate directions to reverse a sign of the second optical wavelength moving along the QPM third waveguide.

3. The solid state optical beam steering device of claim 2, further comprising a cladding layer positioned intermediate the first waveguide and the QPM third waveguide.

4. The solid state optical beam steering device of claim 2, further comprising:
   a core of the first waveguide adjacent a cladding layer;
   wherein the non-linear converter is evanescently coupled to the first waveguide.

5. The solid state optical beam steering device of claim 4, wherein the core of the first waveguide is completely surrounded the cladding layer.

6. The solid state optical beam steering device of claim 4, wherein the conversion material of the non-linear converter is bonded directly to the cladding layer over the first waveguide.

7. The solid state optical beam steering device of claim 6, further comprising: an interface defined by a direct abutment of a terminal end of the second waveguide to a first section of the non-linear converter.

8. The solid state optical beam steering device of claim 6, further comprising: a gap defined by a spaced alignment of a terminal end of the second waveguide with a first section of the non-linear converter.

9. The solid state optical beam steering device of claim 6, further comprising:
   a pump generating the optical pump signal that is converted or amplified into the second optical wavelength.

10. The solid state optical beam steering device of claim 6, further comprising:
    a launching area, wherein the non-linear converter formed from a conversion material defines at least a portion of the launching area.

11. The solid state optical beam steering device of claim 10, wherein the conversion material is orientation patterned gallium arsenide (OP-GaAs).

12. The solid state optical beam steering device of claim 10, wherein the conversion material of the non-linear converter is lattice matched with the first waveguide.

13. The solid state optical beam steering device of claim 12, wherein the conversion material is orientation patterned gallium phosphide (OP-GaP).

14. A method for solid state optical beam steering comprising:
    transmitting a first optical wavelength along a first waveguide associated with a first channel;
    modulating the first optical wavelength by a phase modulator;
    transmitting an optically pumped pump signal along a second waveguide associated with the first channel;
    transferring protonic energy from the first optical signal wavelength to the pump signal via evanescent coupling;
    converting one of a frequency and a wavelength of the pump signal in a non-linear converter to create a second optical wavelength associated with the first channel; and
    steering an optical beam horizontally through a phase difference of the second optical wavelength in the first channel relative to another second optical wavelength generated in a second channel.

15. The method for solid state optical beam steering of claim 14, further comprising:
    transmitting the second optical wavelength along a quasi-phase matched (QPM) non-linear converter including a plurality of aligned alternating crystal orientations.

16. The method for solid state optical beam steering of claim 15, wherein converting one of the frequency and wavelength of the second optical wavelength occurs subsequent to the modulating of the first optical wavelength in the QPM non-linear converter.

17. The method for solid state optical beam steering of claim 16, further comprising:
    pointing an optical beam at an approaching hostile target, wherein the optical beam is steered based, at least in part, on the second optical wavelength; and
    effecting disablement of an enemy guidance system on the approaching hostile target.

18. The method of claim 14, wherein the step of steering the optical beam is accomplished without any moving mechanical parts.

19. At least one non-transitory computer readable storage medium having instructions encoded thereon, that when executed by one or more processors carried by an aircraft vehicle perform operations to effect disablement of a guidance system on the approaching hostile target, the operations include:
    (i) transmit a first optical wavelength along a first waveguide associated with a first channel;
    (ii) modulate the first optical wavelength by a phase modulator;
    (iii) transmit a pumped second optical wavelength along a second waveguide associated with the first channel;
    (iv) transfer protonic energy from the first optical wavelength to the second optical wavelength via evanescent coupling; and (v) convert one of the frequency and wavelength of the second wavelength in a non-linear converter to create a first optical end signal associated with the first channel.

20. The at least one non-transitory computer readable storage medium of claim 19, in combination with a semiconductor optical amplifier operable in a midwave infrared (MWIR) range and a longwave infrared (LWIR) range comprising:
- a first waveguide to transmit the first optical wavelength;
- a phase modulator modulating the first wavelength;
- a second waveguide to transmit the second optical wavelength, wherein the first waveguide is evanescently coupled to the second waveguide; and
- a quasi-phase matched (QPM) non-linear converter in optical communication with the second waveguide.

* * * * *